United States Patent

[11] 3,590,974

| [72] | Inventor | Marion W. Loveless |
| | | 419 South Allegheny, Tulsa, Okla. 74112 |
| [21] | Appl. No. | 847,259 |
| [22] | Filed | Aug. 4, 1969 |
| [45] | Patented | July 6, 1971 |

[54] DESCRAMBLER
4 Claims, 2 Drawing Figs.

[52] U.S. Cl. .................................................. 198/30, 198/33, 198/41
[51] Int. Cl. ...................................................... B65g 47/00, B65g 47/30
[50] Field of Search ................................ 198/30, 33 R, 41

[56] References Cited
UNITED STATES PATENTS

| 1,495,610 | 5/1924 | Paridon | 198/30 |
| 1,972,488 | 9/1934 | Kimball et al. | 198/30 |
| 1,972,489 | 9/1934 | Rideout et al. | 198/33 |
| 2,684,147 | 7/1954 | Holstebro | 198/30 |
| 2,775,334 | 12/1956 | Jeremiah | 198/30 |
| 2,910,165 | 10/1959 | Byington | 198/30 |
| 3,447,663 | 6/1969 | Sarovich | 198/41 |

*Primary Examiner*—Harvey C. Hornsby
*Assistant Examiner*—W. Scott Carson
*Attorney*—Head and Johnson ABSTRACT: In an apparatus for the descrambling and aligning of paramagnetic cans, an elevator conveyor has a magnetic plate directly beneath the upper flight of the belt, the magnetic plate having an upper end contoured so as to be in a plane substantially tangential to the upper roller so that the cans riding on the elevator conveyor are held in an upright position by the magnetic attraction force of the magnetic plate and are conveyed onto a discharge conveyor in the same upright position.

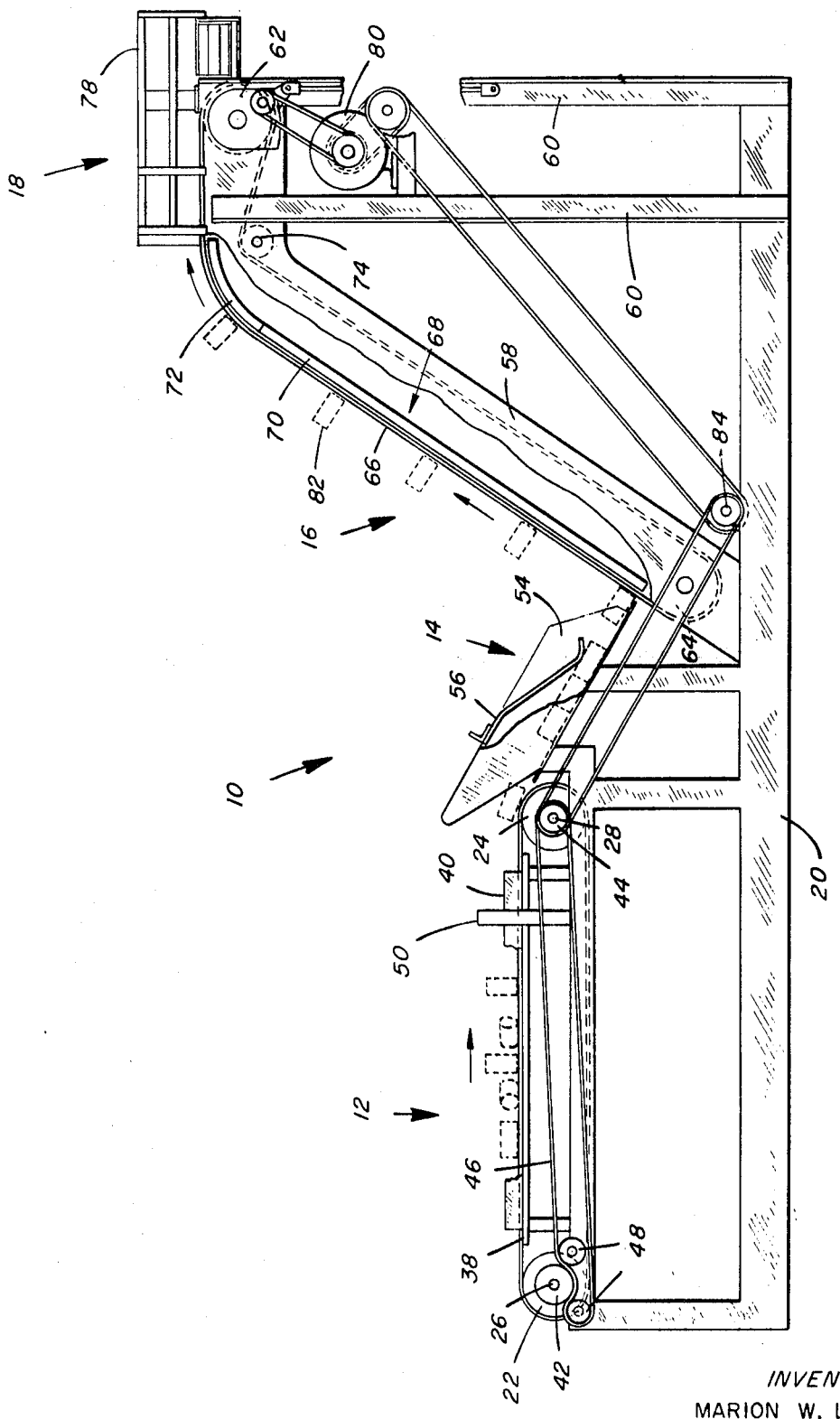

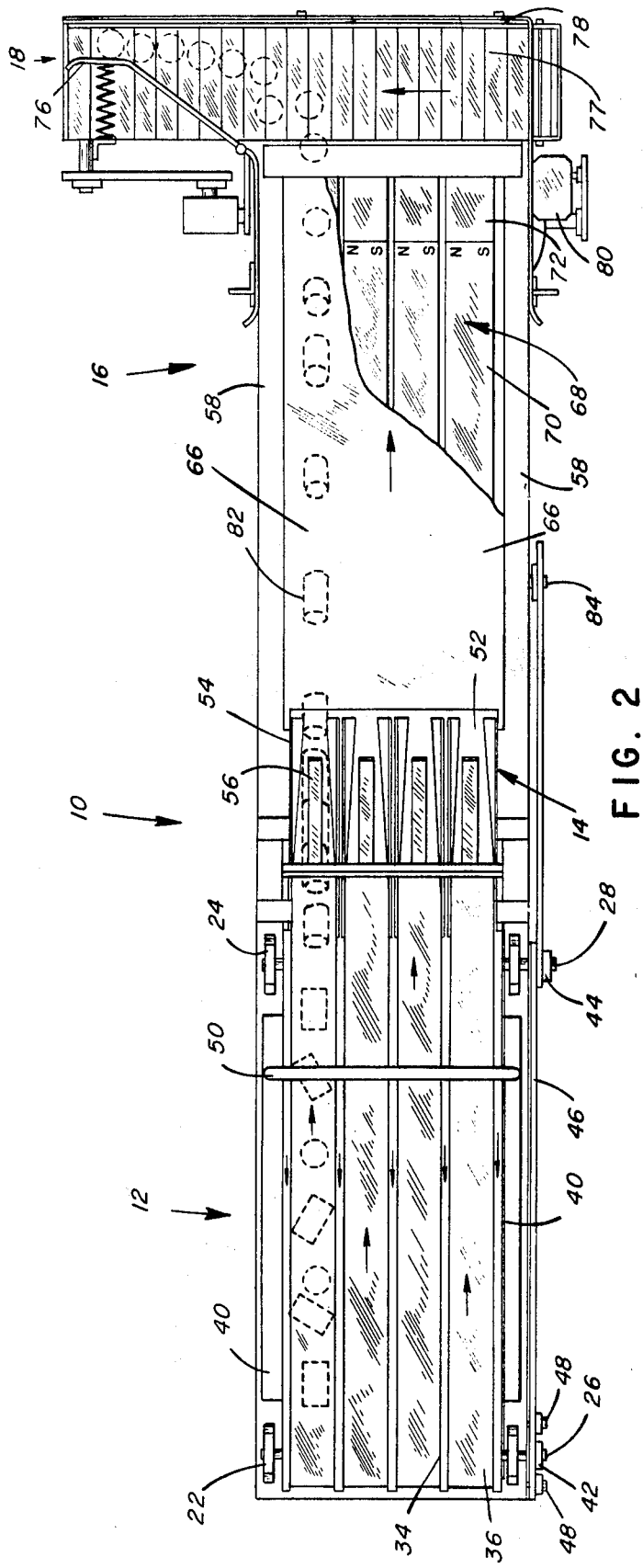

DESCRAMBLER

BACKGROUND OF THE INVENTION

This invention relates to an apparatus for the aligning and sorting of objects and more particularly to an apparatus for aligning paramagnetic cans, for raising the cans from a lower to an upper plane, and for disposing the cans on the upper plane in an upright position.

Presently, there are a multitude of apparatus for the conveying of cans up an inclined plane. Generally, these devices comprise an elongated upwardly inclined frame with belt drums at each end having an endless belt wrapped therebetween. In some of the apparatus, magnets are used to hold the cans against the belt as the belt travels upwardly; however, problems are encountered in the dispositioning of the paramagnetic cans from the conveyor in an upright position. One method used is to have upwardly extending cleats on the outer surface of the belt. The cleats serve to hold the cans as the belt travels upwardly and to push the cans from the upper end of the conveyor. A second method used is to incorporate a magnet internally within the top belt drum of the apparatus thereby extending the magnetic field into a horizontal plane whereby the attraction of the magnetic field holds the cans in the desired position until the cans proceed from the conveyor. The main objection of the first method is that the belt having the cleats thereon is subjected to wear and thus replacement becomes necessary and maintenance expense is incurred. The second method has the disadvantage of being expensive to fabricate.

It is the object of this invention to provide an apparatus for the aligning and depositing of paramagnetic cans in a predetermined position incorporating a magnetic elevator conveyor.

It is a further object of this invention to provide an apparatus wherein the magnetic elevator conveyor portion has a magnetic plate directly beneath the upward flight of the belt and having an upper horizontal segment substantially tangent to the upper belt drum.

GENERAL BACKGROUND OF THE INVENTION

Generally, the invention consists of a feed conveyor, an aligning chute, an elevator conveyor and a discharge conveyor. The feed conveyor has wrapped between a rearward roller and a forward roller a forward traveling flat belt bordered on both sides by rearward traveling V-belt, the V1belt thus forming a raised lip along the longitudinal sides of the flat belt. Extending forwardly and downwardly from the feed conveyor is the aligning chute. Extending obliquely upwardly from the lower end of the aligning chute is the magnetic elevator conveyor which has an upper and lower belt drum with an endless belt therebetween. Immediately under the lower surface of the conveyor belt in its upward flight is a magnetic plate which has its upper section contoured to be in a plane substantially tangent to the upper roller. A horizontal discharge conveyor having an endless chain belt is located at the upper end of the magnetic elevator conveyor.

Cans dumped at the rearward end of the horizontal feed conveyor are longitudinally aligned on their sides as they progress forwardly and enter the aligning chute. The chute disposes the cans onto the lower end of the magnetic belt in a position perpendicular to the belt. The magnetic force created by the magnetic plate under the conveyor belt holds the can in the perpendicular position as the can progresses upwardly on the belt as the belt transcends from an oblique to a horizontal plane at the upper end of the elevator conveyor. Finally, the can proceeds onto the discharge conveyor in the perpendicular position.

BRIEF DESCRIPTION OF THE DRAWINGS

FIG. 1 is a side view of the apparatus.
FIG. 2 is a plan view of the apparatus.

DETAILED DESCRIPTION OF THE PREFERRED EMBODIMENT

Looking at FIG. 1, generally the apparatus is designated as numeral 10. The apparatus has four main parts, a feed conveyor 12, a chute 14, an elevator conveyor 16 and a discharge conveyor 18. Feed conveyor 12, horizontally mounted between two parallel upwardly extending side portions of supporting frame 20, has a rearward roller 22 and a forward roller 24. The rearward roller 22 is composed of a first shaft 26 having a plurality of grooved pulleys keyed thereon in spacial relationship and having cylindrical drums rotatably received thereon intermediate neighboring pulleys. Forward roller 24 is composed of a second shaft 28 having grooved pulleys rotatably received thereon and having, intermediate neighboring pulleys, cylindrical drums keyed to the shaft 28. When rotatably received on the frame 20, the forward roller 24 and rearward roller 22 are in plan alignment, that is, each pulley on the forward roller 24 has a corresponding pulley on the rearward roller 22; likewise, each drum on one roller has a correspondingly aligned drum on the other roller. As can best be seen in FIG. 2, each pair of corresponding pulleys has an endless V-belt 34 therebetween and each corresponding set of cylindrical rollers has wrapped therebetween an endless flat belt 36. In this alternating arrangement of V-belts 34 and flat belts 36, the V-belts act as a raised lip surface along the longitudinal edges of the flat belts 36.

Looking at the rearward roller 22, a single groove first drive pulley 42 is keyed to first shaft 26 at a point outward from the shaft's rotatably mounting to frame 20. Likewise, mounted on second shaft 28 of the forward drum member 24 in aligned position with said first drive pulley 42 is a double groove second drive pulley 44. Looped in one of the grooves of the second drive pulley 44 is a first endless drive belt 46 which extends therefrom and makes movable contact with drive pulley 42 in such a manner that drive pulley 42 is outside of the loop of the first drive belt 46; guide rollers 48 hold the belt 46 in firm contact with the drive pulley 42. Thus, whenever forward rotation is imparted to the flat belts 36, by shaft 22, the V-belts 34 will rotate in a rearwardly direction by shaft 26.

Intermediate the rearward roller 22 and the forward roller 24 and extending substantially the distance therebetween and transversing across the aggregate width of the V-belts 34 and flat belts 36 and directly beneath the belts is a metal plate 38 held in position by being attached to the frame 20 by suitable means. Extending upwardly along both side edges of said plate 38 is railing 40 which restrains the belts from transverse movement. Transversing above the combined width of the flat belts 36 and V-belts 34 intermediate the rearward roller 22 and the forward roller 24 is a horizontal bar 50 which serves to cause any can 82 riding uprightly on flat belts 36 to assume a horizontal side position as the can passes thereunder.

Extending forwardly and downwardly from the forward end of the feed conveyor 12 is chute 14. Chute 14 has a plurality of compartments 52 in side by side relationship, each individual compartment being in plan alignment with one of the flat belts 36 of the feed conveyor 12 and having sidewalls 54 upwardly extending in cross section and sloping towards each other in plan whereby the upper end of each compartment 52 is wider than the lower end. A resilient restraining arm 56 intermediate the sidewalls cantileverally extends obliquely downwardly within each compartment but does not come into contact with the bottom of the compartments 52.

The elevator conveyor 16, extending in an upwardly inclined direction from the lower end of the chute 14, has a supporting frame consisting of two parallel spaced upwardly obliquely extending side members 58, the lower ends of said side members 58 being rigidly attached to the frame 20 by means such as welding and the upper ends being supported to frame 20 by vertical supports 60. In addition, there are suitable cross bracings between the side members 58. The upper ends of the side members 58 are curved so as to be substantially horizontal to the feed conveyor 12.

Transversely and rotatably received between the upper ends of side members 58 there is an upper belt drum 62 and between the lower ends is a lower belt drum 64. Wrapped around and extending between these belt drums is an endless belt 66 having a width slightly greater than the width of the aligning chute 14.

Directly below the inner surface of the upward flight of belt 66 and within a downwardly extending outline thereof are a plurality of magnetic plates 68 extending in abreast relationship substantially between the upper belt drum 62 and the base belt drum 64. Each magnetic plate 68 is in close proximity to but not contiguous with neighboring plates and each has a lower upwardly inclined straight section 70 and an upper curved section 72 having a downwardly inclined portion and a substantially horizontal portion which is substantially tangent to the upper belt drum 62. The upper end of the straight section 70 abuts the downwardly inclined portion of the curved upper section 72. The magnetic poles of each of the guide plates 68 are perpendicular to the direction of the travel of the belt and are arranged in such a manner that adjacent edges of the neighboring magnetic plates 68 have opposite polarity as denoted in FIG. 2 by the letters N and S. Suitable guide rollers 74 disposed between the side members outside the loop of the belt 66 are used to maintain proper tension on the belt.

Adjacent to the upper end of the magnetic conveyor and running at a right angle thereto is a discharge conveyor 18 composed of a chainlike endless belt 77 encircling two rollers, not shown, in a manner commonly known in the art. Suitable guard railing 78 is provided along the outer periphery of the discharge conveyor 18 and above the upper surface of chainlike endless belt and part way transversing thereover is a pivotal arm 76 which is spring biased toward the guard railing 78.

Movement is imparted to the endless belts on the various conveyors by an electrical motor 80, coupled to the various shafts on the rollers by belt and pulley means as is commonly done in the art as is shown in FIG. 1. Intermediate coupling pulleys 84 are used where necessary.

In operation, paramagnetic cans 82 are dumped onto the flat belts 36 at the rearward end of the horizontal feed conveyor 12 in a scrambled relationship. Due to the opposite direction of travel of the V-belts 34 with respect to the flat belts 36, the cans 82 tend to become longitudinally aligned as they progress forwardly on flat belts 36. Any can 82 riding on the flat belts 36 in an upright position assumes a horizontal side position as it passes under the knock down bar 50. From the horizontal feed conveyor 12, the cans slide downward within the individual compartments 52 of the chute 14 wherein the sidewalls 54 and the restraining arm 56 of said compartments 52 position the cans so that they are conveyed from the chute 14 onto the endless belt 66 perpendicularly, thence to the lower end of the magnetic conveyor 16 and directly over one of the magnetic plates 68.

The magnetic force created by the magnetic field within each magnetic plate 68 holds the cans 82 against the belt 68 in perpendicular position as the flat belt progresses up the magnetic conveyor 16 and over the curved portion 72 of the magnetic plate whereby the cans 82 are delivered at the upper end in a horizontal plane. The cans 82 are then conveyed onto the horizontal discharge conveyor 18 where the spring bias pivotal arm 76 acting in conjunction with the outer guard railing 78 arrange the cans 82 in tandem space single file relationship.

In describing the preferred embodiment of this invention, specific terminology has been resorted to for the sake of clarity. However, it is to be understood that each specific term used herein includes all technical equivalents which operate to accomplish a similar purpose.

What I claim is:

1. An apparatus for the unscrambling of paramagnetic cans comprising, in combination,
  a feed conveyor onto which said cans in scrambled positions are discharged, said conveyor having a forward and a rearward roller with an endless flat belt looped therebetween;
  a horizontal bar intermediate said forward and rearward rollers and transversing across, above and parallel said flat belt whereby any of said cans riding uprightly on said belt are caused to assume a horizontal position;
  a chute downwardly and forwardly extending from the forward roller of said first horizontal conveyor, the sides of said chute mutually progressing towards each other as said chute extends downwardly whereby the upper end of said chute is greater in width than the lower end; sides, a restraining arm supported at the upper end thereof and obliquely downwardly extending between said chute sides, whereby said cans received from said feed conveyor slide down said chute and are aligned in single file end to end relationship; and
  an elevator conveyor extending in an upwardly inclined manner from the lower end of said chute, said elevator conveyor including
  an upwardly inclined elongated parallel sided supporting frame,
  a lower belt drum rotatably mounted between said frame sides at the lower ends thereof,
  an upper belt drum rotatably mounted between said frame sides at the upper end thereof,
  an endless flat belt positioned between and around said belt drums providing a moving upper and lower flight, the upper flight moving in the upwardly inclined direction at least the lower portion of the upper flight of said flat belt extending in a plane perpendicular the plane of said chute whereby one end of each of said cans sliding down said chute engages flat against said upper flight of said belt, and
  a magnetic plate rigidly supported between said frame sides directly beneath the upper flight of said flat belt and between said lower belt drum and said upper belt drum, the upper surface of said magnetic plate upon which the upper flight of said flat belt moves having a curved upper portion configured so as to terminate in a plane substantially horizontally and in tangential relationship to said upper belt drum whereby said paramagnetic cans received onto the lower end of said flat belt from said chute in a perpendicular position are magnetically held in said perpendicular position by said magnetic plate as said cans ride upwardly on said belt, said cans transcending from an inclined plane and being delivered in a horizontal plane at the upper end of said flat belt.

2. An apparatus for the unscrambling of paramagnetic cans as in claim 1 including
  a discharge conveyor extending from the upper belt drum of said elevator conveyor and having two roller members with an endless belt wrapped therebetween,
  a raised rail along one side of said second horizontal conveyor,
  a pivotal arm transversing part way across the upper surface of said endless belt and spring biased towards said raised rail whereby said paramagnetic cans received perpendicularly onto said endless belt from said elevator conveyor are arranged in single file relationship.

3. An apparatus for the unscrambling of paramagnetic cans as in claim 1 wherein said flat belt on the said feed conveyor has along each longitudinal edge a V-belt in raised relationship thereto, the direction of the said V-belt being opposite to the direction of the said flat belt.

4. A device as in claim 3 wherein
  said feed conveyor has a plurality of alternating V-belts and flat belts looped around said rearward and forward rollers, said V-belts being in raised relationship to said flat belts, the travel of the said V-belts being in opposite direction to the travel of said flat belts whereby said cans progressing forwardly on said flat belts become substantially parallel with the longitudinal axis of said flat belts,
  said horizontal bar transversely across and above the aggregate width of said flat belts and V-belts,
  said chute having a plurality of compartments in abreast relationship, each of said compartments extending downwardly and forwardly in plan alignment from one of said flat belts on said first horizontal conveyor, the sides of each compartment mutually progressing towards each other as said compartment extends downwardly whereby the upper end of each of said compartments is of a width greater than the corresponding lower end, each of said compartments having a restraining arm supported from the upper end thereof and obliquely downwardly extending between said sides of said compartments, said elevator conveyor having a plurality of said magnetic plates in abreast relationship, each individual magnetic plate being in plan alignment with the lower end of one of said compartments of said chute, said magnetic plates being in close proximity but not contiguous with neighboring magnetic plates, the magnetic plates being so arranged that the adjacent edges of neighboring plates have opposite magnetic poles, said endless belt of said elevator conveyor being of a width slightly greater than the aggregate width of said magnetic plates in said abreast relationship.